(12) United States Patent
Amin et al.

(10) Patent No.: US 10,916,154 B2
(45) Date of Patent: Feb. 9, 2021

(54) LANGUAGE LEARNING AND SPEECH ENHANCEMENT THROUGH NATURAL LANGUAGE PROCESSING

(71) Applicant: INTERNATIONAL BUSINESS MACHINES CORPORATION, Armonk, NY (US)

(72) Inventors: Mahmoud Amin, Staten Island, NY (US); Zhenxing Bi, Schenectady, NY (US); Lawrence A. Clevenger, Rhinebeck, NY (US); Leigh Anne H. Clevenger, Rhinebeck, NY (US); Christopher J. Penny, Saratoga Springs, NY (US); Krishna R. Tunga, Wappingers Falls, NY (US); Loma Vaishnav, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 15/793,519

(22) Filed: Oct. 25, 2017

(65) Prior Publication Data
US 2019/0122574 A1    Apr. 25, 2019

(51) Int. Cl.
*G09B 5/02* (2006.01)
*G09B 19/04* (2006.01)
(Continued)

(52) U.S. Cl.
CPC ............... *G09B 5/02* (2013.01); *G06F 16/40* (2019.01); *G06F 40/40* (2020.01); *G09B 19/04* (2013.01); *G09B 19/06* (2013.01); *G10L 15/26* (2013.01)

(58) Field of Classification Search
CPC ......... G09B 5/02; G09B 19/04; G09B 19/06; G09B 5/00; G06F 16/40; G06F 17/28; G06F 40/40; G10L 15/26
See application file for complete search history.

(56) References Cited

U.S. PATENT DOCUMENTS

| 5,487,671 | A | 1/1996 | Shpiro et al. |
| 5,717,828 | A | 2/1998 | Rothenberg |
| | | (Continued) | |

FOREIGN PATENT DOCUMENTS

WO    WO2008108512    9/2008

OTHER PUBLICATIONS

Sysoev, et al., "Exploring SpeechBlocks: Piloting a Constructionist Literacy App with Preschool Children", American Speech-Language Hearing Association, Nov. 2016, pp. 1-3.

*Primary Examiner* — Timothy A Musselman
(74) *Attorney, Agent, or Firm* — Tutunjian & Bitetto, P.C.; Douglas Pearson

(57) ABSTRACT

A computer-implemented method, a computer program product, and an incremental learning system are provided for language learning and speech enhancement. The method includes transforming acoustic utterances uttered by an individual into textual representations thereof, by a voice-to-language processor configured to perform speech recognition. The method further includes accelerating speech development in the individual, by an incremental learning system that includes the voice-to-language processor and that processes the acoustic utterances using natural language processing and analytics to determine and incrementally provide new material to the individual for learning.

18 Claims, 9 Drawing Sheets

(51) Int. Cl.
    *G10L 15/26*     (2006.01)
    *G09B 19/06*     (2006.01)
    *G06F 16/40*     (2019.01)
    *G06F 40/40*     (2020.01)

(56) References Cited

U.S. PATENT DOCUMENTS

| | | |
|---|---|---|
| 5,893,720 A | 4/1999 | Cohen |
| 6,305,942 B1 | 10/2001 | Block et al. |
| 8,272,874 B2 | 9/2012 | Julia et al. |
| 9,280,969 B2 | 3/2016 | Li et al. |
| 9,489,940 B2 | 11/2016 | Corfield |
| 2003/0040899 A1 | 2/2003 | Ogilvie |
| 2004/0215445 A1 | 10/2004 | Kojima |
| 2005/0175970 A1 | 8/2005 | Dunlap et al. |
| 2008/0166686 A1* | 7/2008 | Cook ............... G09B 5/00 434/118 |
| 2011/0123967 A1* | 5/2011 | Perronnin ........... G09B 7/02 434/178 |
| 2012/0295510 A1* | 11/2012 | Boeckle ............ A63H 3/28 446/72 |
| 2015/0099255 A1* | 4/2015 | Aslan ............... G09B 5/08 434/350 |
| 2015/0294588 A1 | 10/2015 | Kullok et al. |

\* cited by examiner

| Baby speaking (710) | Examples of similar sounding words (720) | Synonyms (or closely related) (730) | Antonyms (740) | Examples of incrementally advanced words/phrases/rhymes (750) |
|---|---|---|---|---|
| Ba Ca Sa | Bake Case Cake Bus | Broil Purse Candy Truck | Raw Chips | Words: Basket, Biscuit, Bucket... Phrases: Bake the cake, Bus Stop... Rhymes: Baa Baa Black Sheep... |
| Kaa Taa Naa | Kite Night Take Key | Drone Dark Lock | Day Light Give | Words: Kitten, Mitten, Tanker... Phrases: Fly the Kite, Take the Key... |
| Saa waa naa daa | Saw Want Dawn | Eyes Need Rise | Hide Deny Dusk | Words: Sunshine, Dinosaur... Phrases: Incy Wincy Spider... |

FIG. 7

LANGUAGE LEARNING AND SPEECH ENHANCEMENT THROUGH NATURAL LANGUAGE PROCESSING

BACKGROUND

Technical Field

The present invention relates generally to machine learning and, in particular, to language learning and speech enhancement through natural language processing.

Description of the Related Art

Some infants and toddlers could have a delayed speech onset. They need assistance in hastening their speech, language and vocabulary.

Children need to be taught gradually and incrementally beyond their current language capability for a good rate of progress in language learning. Most cannot learn if what is taught is too complex compared to what they already know.

Hence, there is a need for a user adaptable machine learning approach.

SUMMARY

According to an aspect of the present invention, a computer-implemented method is provided for language learning and speech enhancement. The method includes transforming acoustic utterances uttered by an individual into textual representations thereof, by a voice-to-language processor configured to perform speech recognition. The method further includes accelerating speech development in the individual, by an incremental learning system that includes the voice-to-language processor and that processes the acoustic utterances using natural language processing and analytics to determine and incrementally provide new material to the individual for learning.

According to another aspect of the present invention, a computer program product is provided for language learning and speech enhancement. The computer program product includes a non-transitory computer readable storage medium having program instructions embodied therewith. The program instructions are executable by a computer to cause the computer to perform a method. The method includes transforming acoustic utterances uttered by an individual into textual representations thereof, by a voice-to-language processor configured to perform speech recognition. The method further includes accelerating speech development in the individual, by an incremental learning system that includes the voice-to-language processor and that processes the acoustic utterances using natural language processing and analytics to determine and incrementally provide new material to the individual for learning.

According to yet another aspect of the present invention, an incremental learning system is provided for language learning and speech enhancement. The system includes an Internet of Things device having a voice capture device configured to receive acoustic utterances uttered by an individual. The system further includes a cloud based system. The cloud based system is configured to interface with the Internet of Things device to obtain the acoustic utterances therefrom. The cloud based system is further configured to perform speech recognition to transform the acoustic utterances into textual representations thereof using a voice-to-text processor. The cloud based system is also configured to accelerate speech development in the individual, by processing the acoustic utterances using natural language processing and analytics to determine and incrementally provide new material to the individual for learning. The Internet of Things device further has a hardware media presentation device configured to incrementally provide the new material to the individual from the cloud based system.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 7 shows exemplary scenarios to which the present invention can be applied, in accordance with an embodiment of the present invention;

DETAILED DESCRIPTION

The present invention is directed to language learning and speech enhancement through natural language processing.

In one or more embodiments, the present invention exploits the premise that a learning method that imitates the child and incrementally builds upon it enhances the rate of language learning in kids.

In an embodiment, an incremental learning system is provided which can use the current speech/vocabulary state of the child involved and enhance and build upon current language skills by suggesting/playing back a similar sounding word or a synonym/antonym or an incrementally enhanced language in the form of words/phrases/sentences/rhymes/songs/etc.

In an embodiment, an analysis of a stored learning history can be performed for each individual. This history can be used to analyze each individual's speed of learning, response to new word suggestions (e.g., if synonyms are picked up faster than similar sounding words), classes of words that the individual has not seen in the past, etc. Based on this analysis, a cognitive system can adapt and improve on new word suggestions.

In an embodiment, the learning system can be permanently connected to a cloud voice-to-language processor and a database and can provide recommendations to the child (through the parent and with parental controls) on a continuous basis or whenever requested (on demand).

In an embodiment, the progress can be tracked on a continuous basis and feedback provided to the corresponding parents (or guardian.

In an embodiment, the system can also be used for adults to learn a new language or to enhance their existing knowledge of the language.

Figure 1:
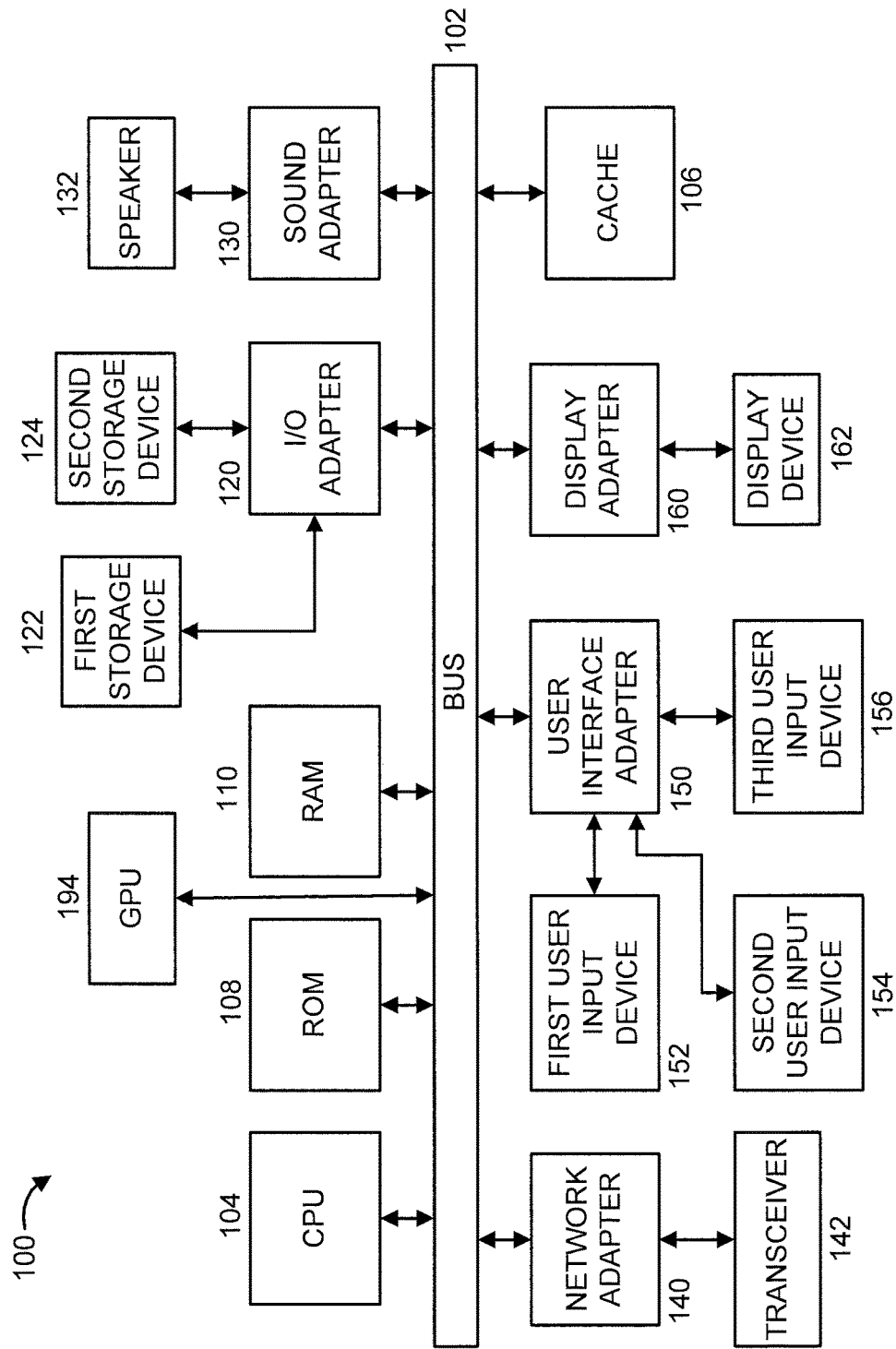
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
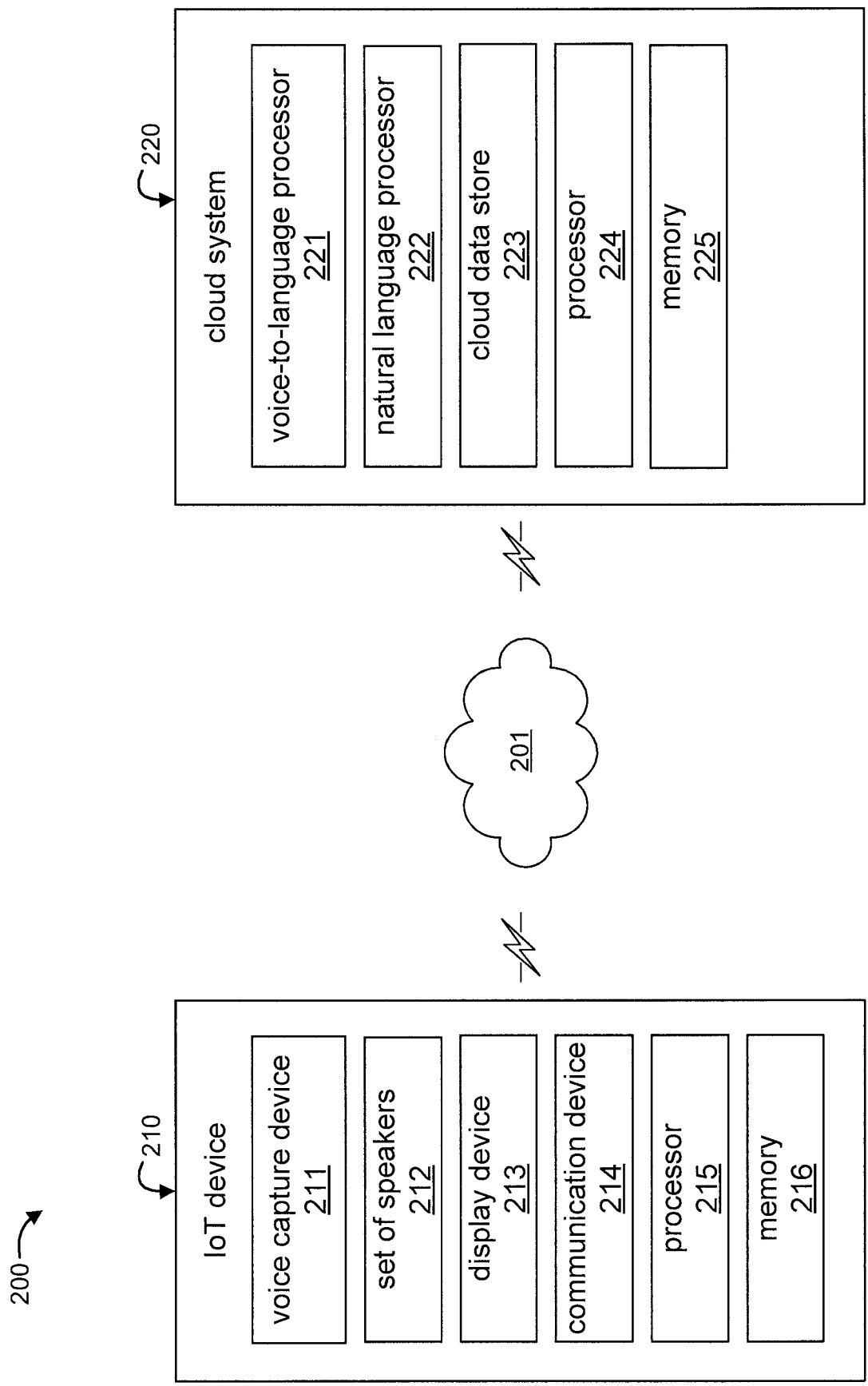
FIG. 2 shows an exemplary system for language learning and speech enhancement, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
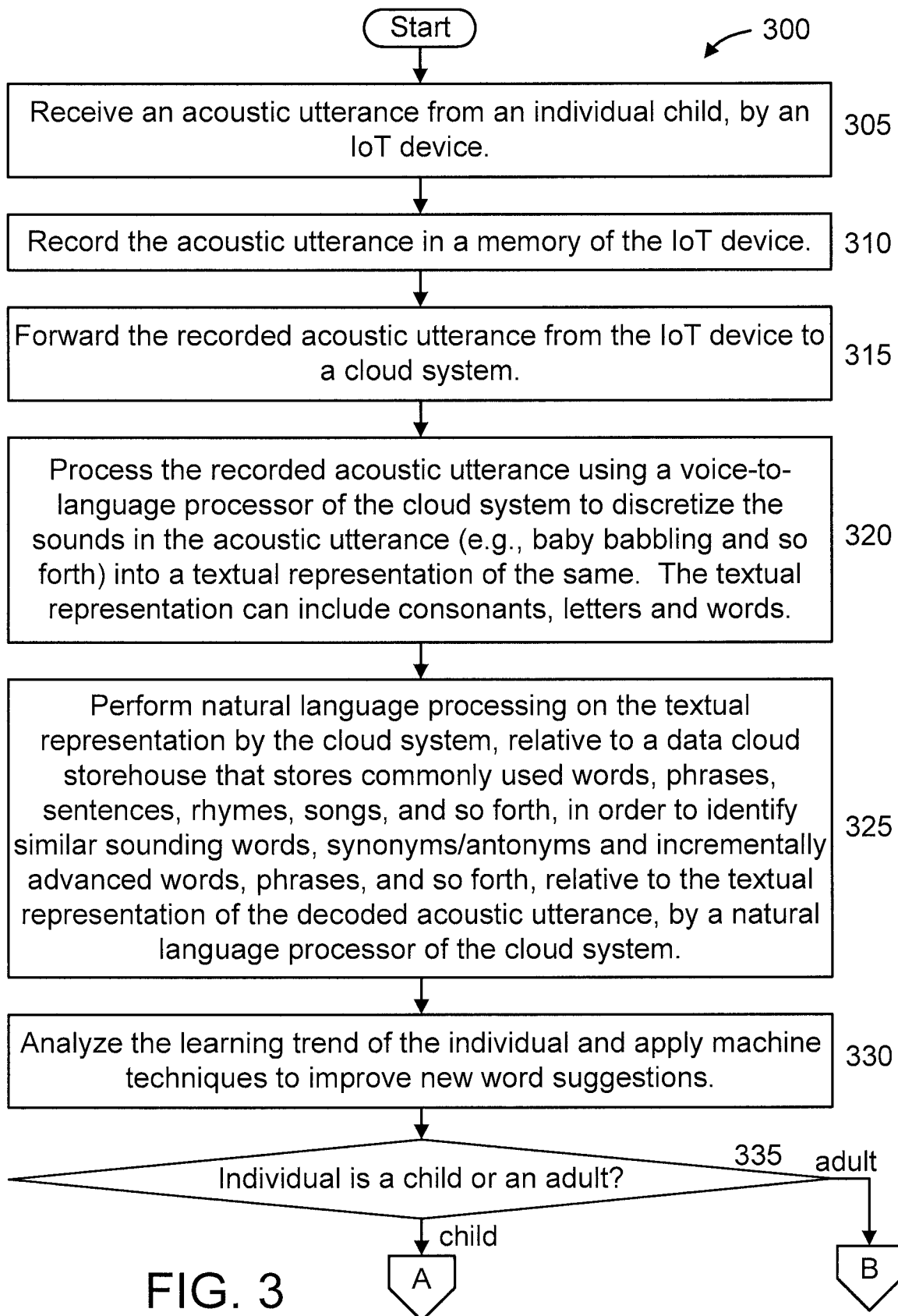
FIGS. 3-5 show an exemplary method for language learning and speech enhancement, in accordance with an embodiment of the present invention.
Figure 4:
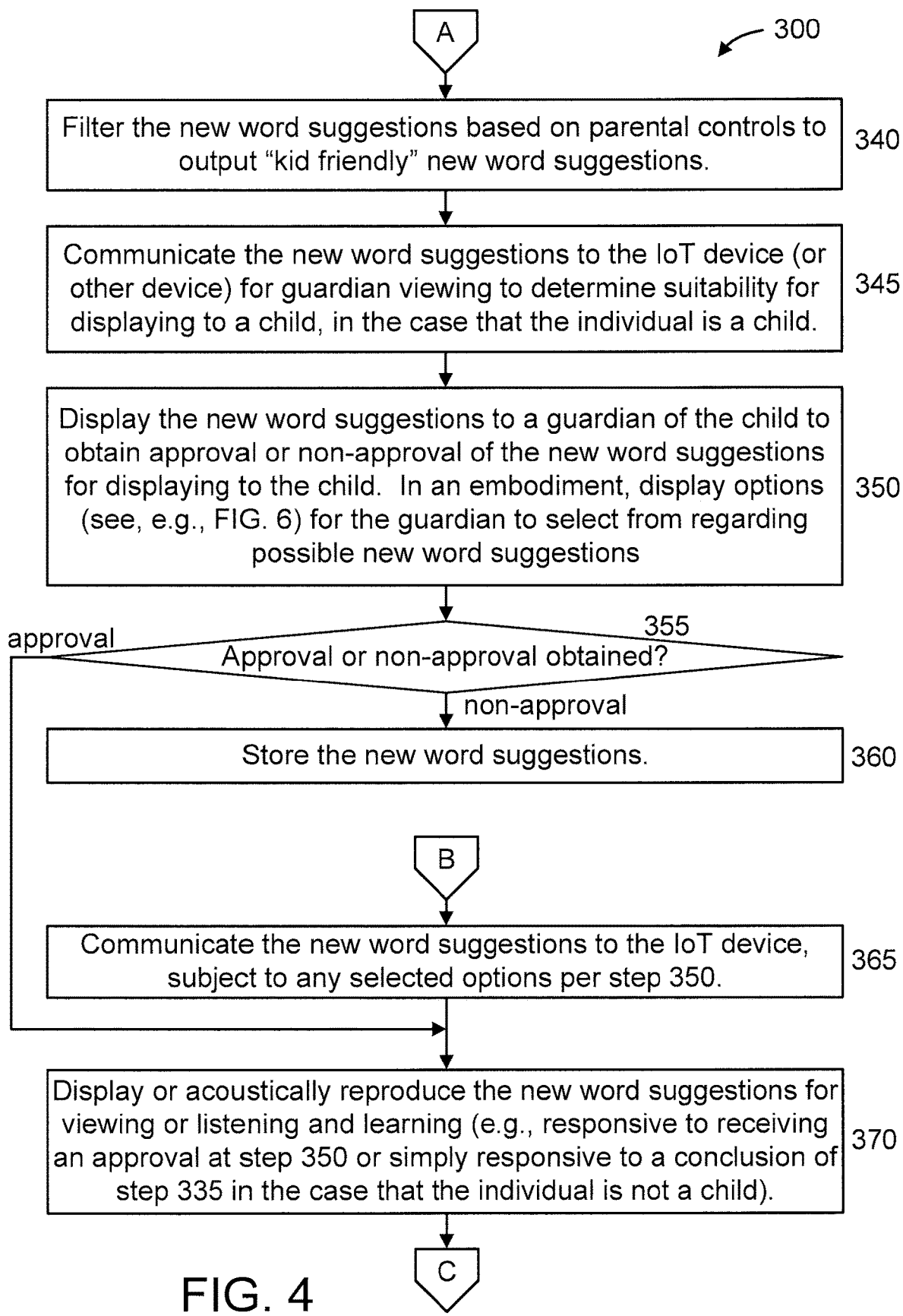
Figure 5:
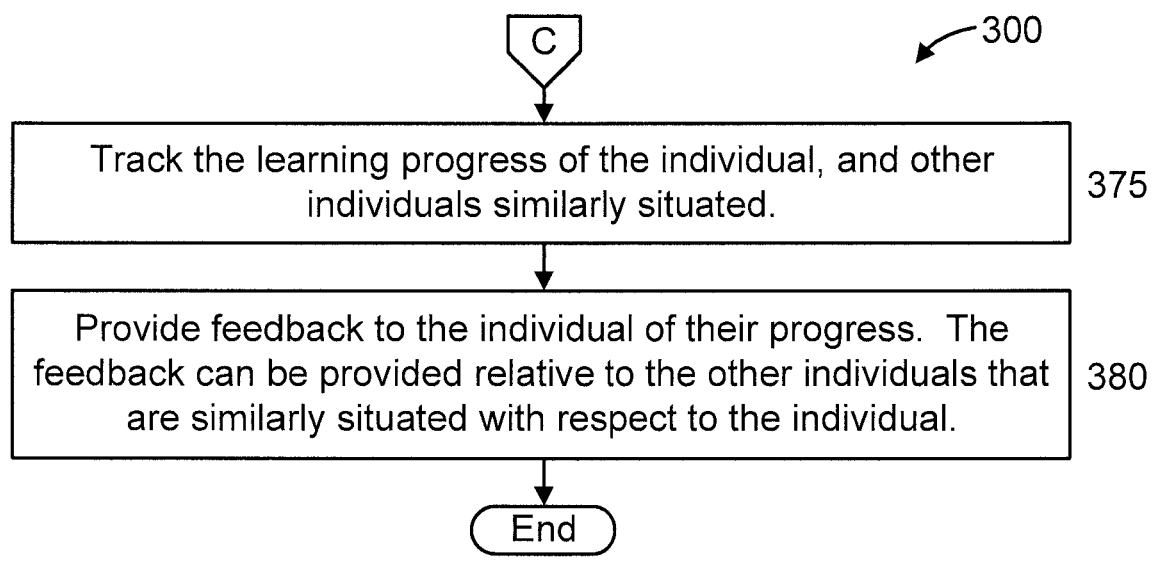

Further, it is to be appreciated that processing system 100 may perform at least part of the method described herein including, for example, at least part of method 300 of FIGS. 3-5. Similarly, part or all of system 200 may be used to perform at least part of method 300 of FIGS. 3-5.

FIG. 2 shows an exemplary system 200 for language learning and speech enhancement, in accordance with an embodiment of the present invention. In an embodiment, the system 200 can be specifically configured for use with children (e.g., babies, toddlers) and learning disabled individuals. In another embodiment, the system 200 can be configured for use with adults in order to implement The system 200 includes an Internet of Thing (IoT) device 210. The IoT device 210 can be, for example, but is not limited to, any of the following: an enhanced baby monitor (enhanced in having the constituent components described below regarding the IoT device 210); a mobile smart phone; a tablet; a laptop computer; desktop computer; and so forth. The preceding devices are merely illustrative and, thus, other types of IoT devices can also be used as IoT device 210, while maintaining the spirit of the present invention.

The IoT device 210 includes a voice capture device 211, a set of speakers 212, a display device 213, a communication device 214, a processor 215, and a memory 216. It is to be appreciated that any of the speakers 212 and display device 213 may be interchangeably referred to herein as "hardware media presentation device(s)".

The voice capture device 211 is used to capture the voice of a subject individual (hereinafter "individual"). The voice capture device 211 can include a microphone to initially capture the voice (acoustic utterances) of the individual. The voice capture device 211 can further include recording/storing capabilities, or can simply be a capture interface, with storage performed by memory 216.

The set of speakers 212 audibly reproduces sound for the individual to listen to and learn from. As examples, the sound can be in the form of words, sentences, phrases, rhymes, songs, and so forth. The preceding items can be provided as suggested learning material to the individual.

The display device 213 displays information to assist in learning. The information can include, for example, but is not limited to, textual representations of acoustic utterances, suggested learning material, and so forth. The suggested learning material can take forms including, but not limited to, words, phases, sentences, rhymes, songs, and so forth.

The communication device 214 allows the IoT device 210 to send and receive information. The communication device 214 can be, for example, but is not limited a Network Interface Controller (NIC), a wireless transceiver, and so forth. In an embodiment, the communication device 214 can use one or more protocols including, but not limited to, cellular, BLUETOOTH, WIFI, Transmission Control Protocol/Internet Protocol (TCP/IP), and so forth.

The memory 216 can store acoustic utterances and/or learning material. The learning material can be suggested learning material. The suggested learning material can take many forms, as described in further detail herein.

The processor 215 controls one or more of the other elements of the IoT device 210, and supports processing performed by the processor 215.

The system 200 further includes a cloud system 220. The cloud system 220 includes a voice-to-language processor 221, a natural language processor 222, a cloud data store 223, a processor 224, and a memory 225.

The voice-to-language processor 221 discretizes an acoustic input (e.g., baby/toddler babbling) to consonants, letters, and words.

The natural language processor 222 performs natural language processing on acoustic utterances uttered by individuals (who are users of the system). To that end, the natural language processor 222 can identify new learning material based on known content by the individual. Such identification can be made relative to cloud data store 223.

The cloud data store 223 stores commonly used words, sentences, phrases, rhymes, songs, and so forth, as well as other learning material depending upon the target individual and their capabilities.

The processor 224 can support the other processors (221 and 222) and can perform parent control functions as described herein.

The memory 225 supports processing performed by the voice-to-language processor 221 and the natural language processor 222 as well as by processor 224.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements (e.g., but not limited to, processors 221, 222, and 224), in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIGS. 3-5 show an exemplary method 300 for language learning and speech enhancement, in accordance with an embodiment of the present invention.

At step 305, receive an acoustic utterance from an individual child, by an IoT device. The individual can be a person of any age. In an embodiment, the individual is a child. In another embodiment, the individual is an adult. In the case of the individual being a child, the acoustic utterance can be babbling by a baby. In the case of the individual being an adult, steps 340-355, which relate to parent controls, can be skipped.

At step 310, record the acoustic utterance in a memory of the IoT device.

At step 315, forward the recorded acoustic utterance from the IoT device to a cloud system.

At step 320, process the recorded acoustic utterance using a voice-to-language processor of the cloud system to discretize the sounds in the acoustic utterance (e.g., baby babbling and so forth) into a textual representation of the same. In an embodiment, the textual representation can include consonants, letters and words.

At step 325, perform natural language processing on the textual representation by the cloud system, relative to a data cloud storehouse that stores commonly used words, phrases, sentences, rhymes, songs, and so forth, in order to identify similar sounding words, synonyms/antonyms and incrementally advanced words, phrases, and so forth, relative to the textual representation of the decoded acoustic utterance, by a natural language processor of the cloud system. The stored items are grammatically correct and can be used as a baseline to evaluate the textual representation of the acoustic utterance. In an embodiment, step 325 can involve discarding incoherent/inconsistent words that may be identified in order to avoid presenting the same to the individual At step 330, analyze the learning trend of the individual and apply machine techniques to improve new word suggestions.

At step 335, determine whether the individual is a child or an adult. If the individual is a child, then proceed to step 340. Otherwise, if the individual is an adult, then proceed to step 365. It is to be appreciated that while the determination of the individual's status is shown relative to step 335, it can be performed earlier in method 300 such that other steps thereafter take the status into account. In an embodiment, the status can be automatically determined in this or earlier steps based on the voice input (acoustic utterance) which can be readily analyzed to determine the status of the individual as either a child or an adult.

At step 340, filter the new word suggestions based on parental controls to output "kid friendly" new word suggestions.

At step 345, communicate the new word suggestions to the IoT device (or other device) for guardian viewing to determine suitability for displaying to a child, in the case that the individual is a child. In an embodiment, another device (other than the IoT) can be a device under the sole control of the guardian (e.g., a smart phone) so that viewing of the new word suggestions is only performed for the guardian.

At step 350, display the new word suggestions to a guardian of the child to obtain approval or non-approval of the new word suggestions for displaying to the child. In an embodiment, display options (see, e.g., FIG. 6) for the guardian to select from regarding possible new word suggestions.

At step 355, determine if approval or non-approval of the new word suggestions was obtained. If an approval was obtained, then proceed to step 370. Otherwise, if a non-approval was obtained, then proceed to step 360.

At step 360, store the new word suggestions. The new word suggestions can be stored for possible later use.

At step 365, communicate the new word suggestions to the IoT device, subject to any of the options selected per step 350.

At step 370, display or acoustically reproduce the new word suggestions for viewing or listening and learning.

At step 375, track the learning progress of the individual, and other individuals similarly situated (having a similar learning rate, etc.).

At step 380, provide feedback to the individual of their progress. In an embodiment, the feedback can be provided relative to the other individuals that are similarly situated with respect to the individual.

Figure 6:
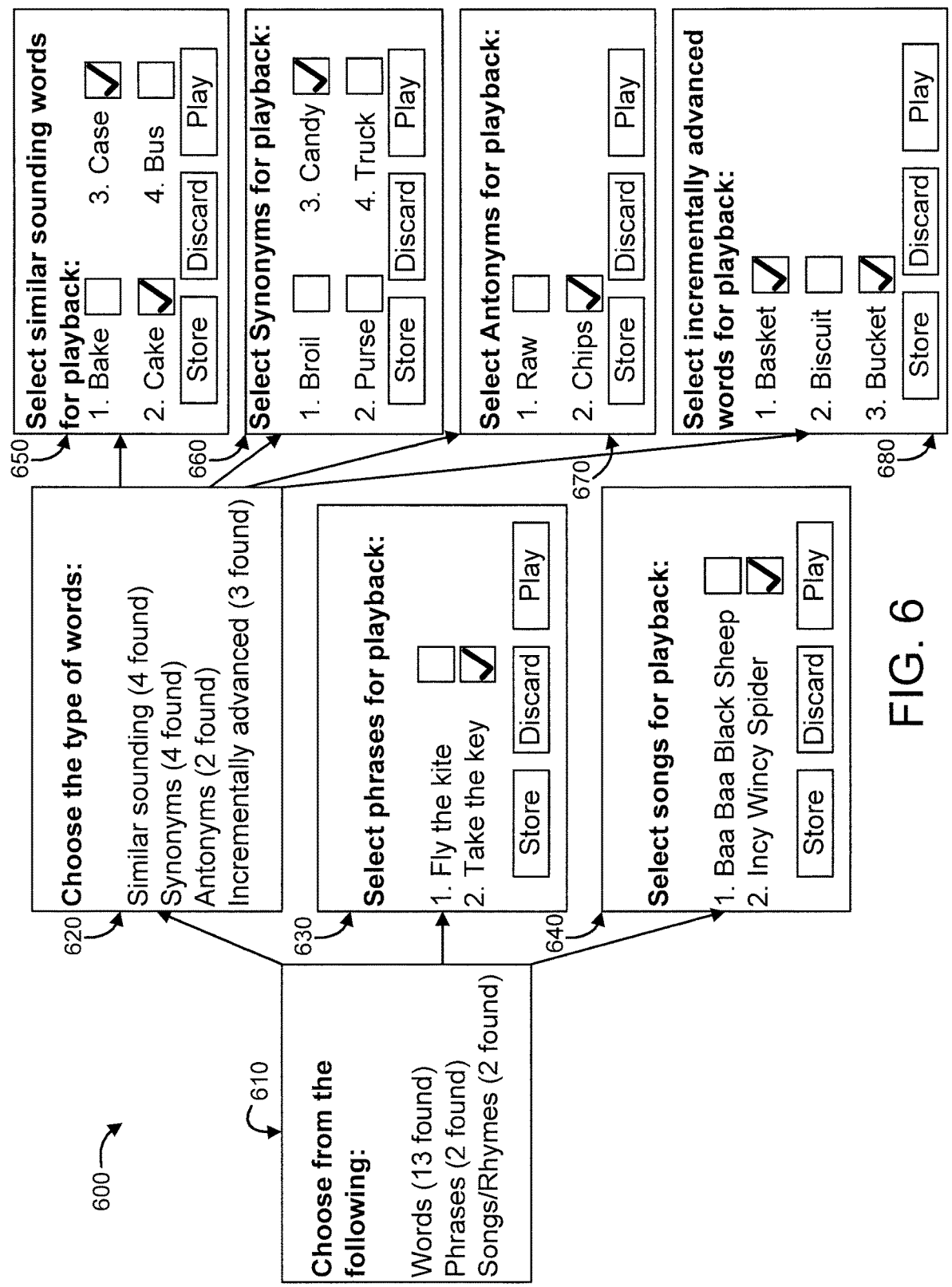
FIG. 6 shows an exemplary output of a step of the method of FIGS. 3-5, in accordance with an embodiment of the present invention.

FIG. 6 shows an exemplary output 600 of step 340 of the method 300 of FIGS. 3-5, in accordance with an embodiment of the present invention. It is to be appreciated that the output 600 relates to a scenario where the individual is a child.

In a first prompt block 610, the following is displayed:
Choose from the following:
  Words (13 found)
  Phrases (2 found)
  Songs/rhymes (2 found)
  Prompt box 610 continues on to prompt boxes 620, 630, and 640.

In prompt box 620, the following is displayed:
Choose the type of words:
  Similar sounding (4 found)
  Synonyms (4 found)

Antonyms (2 found)

Incrementally advanced (3 found)

In prompt box 630, the following is displayed:

Select phrases for playback:

1. Fly the kite
2. Take the key

Box 630 includes check boxes for 1 and 2, as well as the following selections: store, discard, and play.

In prompt box 640, the following is displayed:

Select songs for playback

1. Baa Baa Black Sheep
2. Incy Wincy Spider

Box 640 includes check boxes for 1 and 2, as well as the following selections: store, discard, and play.

Prompt box 620 continues on to prompt boxes 650, 660, 670, and 680.

In prompt box 650, the following is displayed:

Select similar sounding words for playback:

1. Bake
2. Cake
3. Case
4. Bus

Box 650 includes check boxes for 1-4, as well as the following selections: store, discard, and play.

In prompt box 660, the following is displayed:

Select synonyms for playback:

1. Broil
2. Purse
3. Candy
4. Truck

Box 660 includes check boxes for 1-4, as well as the following selections: store, discard, and play.

In prompt box 670, the following is displayed:

Select antonyms for playback:

1. Raw
2. Chips

Box 670 includes check boxes for 1 and 2, as well as the following selections: store, discard, and play.

In prompt box 680, the following is displayed:

Select incrementally advanced words for playback:

1. Basket
2. Biscuit
3. Bucket

Box 680 includes check boxes for 1-3, as well as the following selections: store, discard, and play.

FIG. 7 shows exemplary scenarios 700 to which the present invention can be applied, in accordance with an embodiment of the present invention;

The exemplary scenarios 700 are depicted relative to the following columns: baby speaking 710; example of similar sounding words 720; synonyms (or closely related) 730, antonyms 740, and examples of incrementally advanced words/phases/rhymes, etc.

The baby speaking column 710 includes various acoustic utterances by a baby (e.g., baby babble).

The examples of similar sounding words column 720 includes various examples of similar sounding words to the corresponding acoustic utterance in column 710.

The synonyms column 730 includes various synonyms or closely related words to the corresponding acoustic utterance in column 710.

The antonyms column 740 includes various antonyms relating to the corresponding acoustic utterance in column 710.

The examples of incrementally advanced words/phases/rhymes/etc. column 650 includes various incrementally advanced words/phases/rhymes/etc. relating to the corresponding acoustic utterance in column 710.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
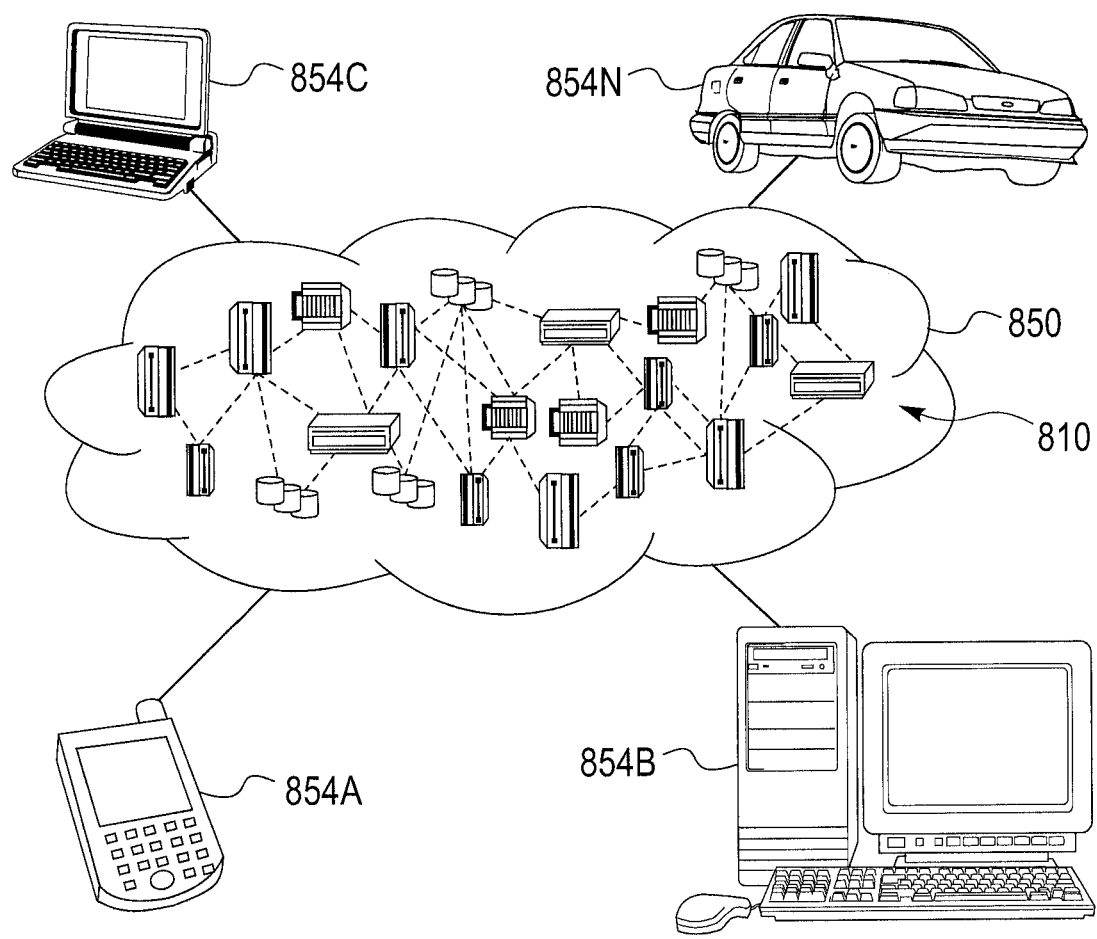
FIG. 8 shows a cloud computing environment, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
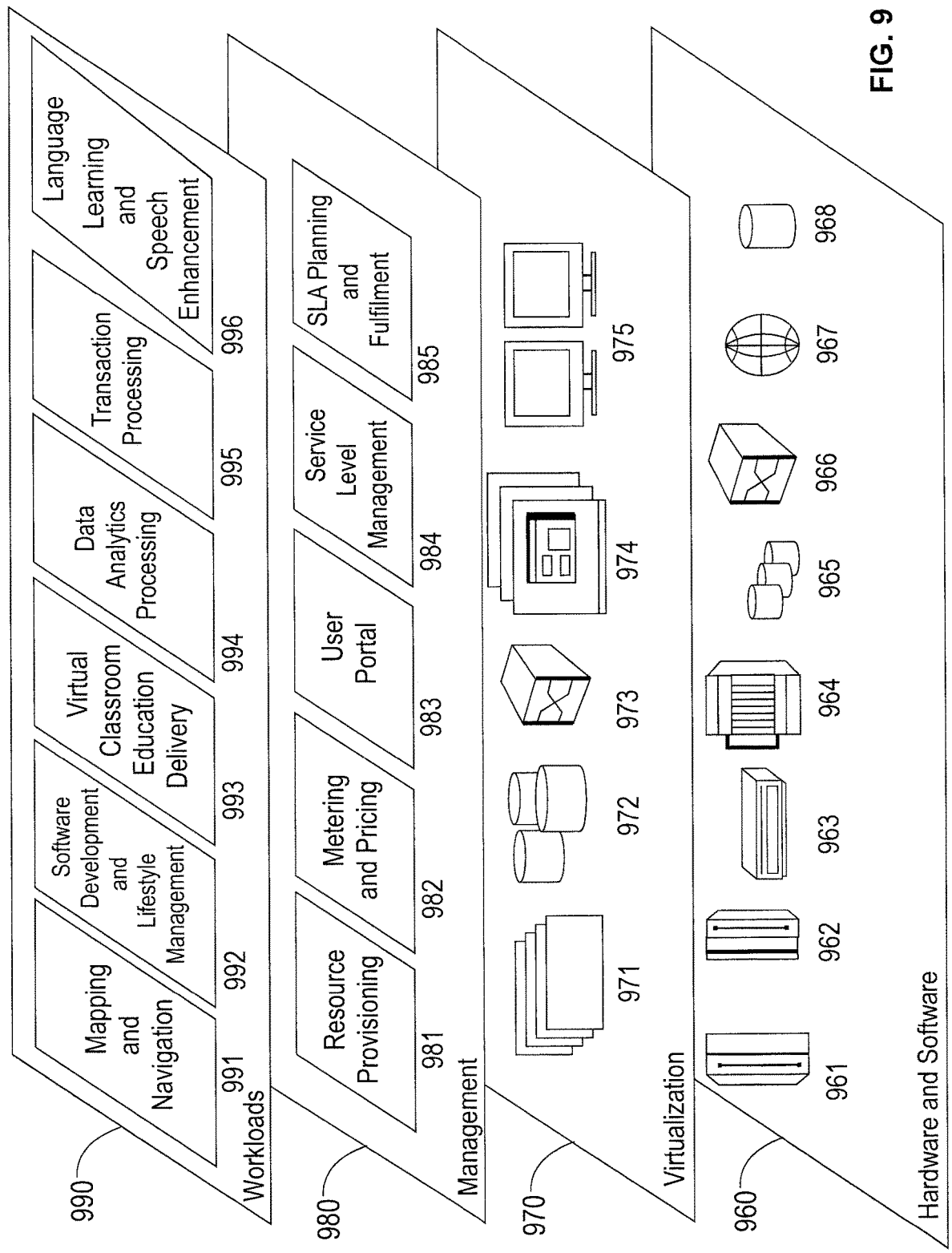
FIG. 9 shows abstraction model layers, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and language learning and speech enhancement 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for language learning and speech enhancement, the method comprising:
    transforming acoustic utterances uttered by an individual into textual representations thereof, by a voice-to-language processor configured to perform speech recognition; and
    accelerating speech development in the individual, by an incremental learning system that includes the voice-to-language processor and that processes the acoustic utterances using natural language processing and analytics to determine and incrementally provide new material to the individual for learning,
    wherein responsive to the individual being a child, the method further comprises:
    displaying, on a display device, the new material to a guardian of the child for approval to reproduce to the child; and
    selectively providing, on a hardware media providing device, the new material to the child responsive to receiving the approval from the guardian, and
    wherein responsive to the individual being a baby, the voice-to-language processor discretizes baby babbling to consonants, letters, and words.

2. The computer-implemented method of claim 1, wherein said accelerating step comprises configuring the incremental learning system to enhance current language skills of the individual using a current speech state and a current vocabulary state of the individual by suggesting, as the new material, a new word related to a known word by the user, the new word related to the known word by a relationship selected from the group consisting of a homonym, a synonym, and an antonym.

3. The computer-implemented method of claim 1, further comprising configuring the incremental learning system to enhance current language skills of the individual using a current speech state and a current vocabulary state of the individual by providing to the individual an incrementally enhanced language that is related to a known word by the user and is in the form of an object selected from the group consisting of a word, a phrase, a sentence, a rhyme, and a song.

4. The computer-implemented method of claim 1, further comprising:
    performing an analysis of a stored learning history for the individual;
    performing an analysis, based on the stored learning history for the individual, of (i) a learning speed of the individual, (ii) responses by the individual to previous new word suggestions, and (iii) classes of words previously unseen by the individual; and
    adapting the new material to a learning ability of the individual, responsive to one or more results of the analysis and one or more machine learning techniques.

5. The computer-implemented method of claim 1, further comprising configuring the incremental learning system to interface with an Internet of Things device used by the individual to initially provide the acoustic utterances.

6. The computer implemented method of claim 5, further comprising a cloud portion that includes the voice-to-language processor and further includes a cloud database that stores information that can serve as the new material, the cloud portion being configured to provide the new material to the individual through the IoT device, responsive to receiving an acoustic utterance from the individual.

7. The computer-implemented method of claim 1, wherein the method further comprises imposing parental controls on the new material to prevent inappropriate content therein from being presented to the child.

8. The computer-implemented method of claim 1, further comprising:
    tracking a learning progress of the individual on a continual basis;
    providing feedback on progress trends of the individual; and
    adapting the new material to the individual, responsive to the feedback.

9. The computer-implemented method of claim 1, further comprising:
    tracking a learning progress of the individual on a continual basis relative to other similar language learners; and
    providing feedback on progress trends of the individual relative to the other similar language learners.

10. The computer-implemented method of claim 1, wherein the method is configured for adult language learning, and the new material includes an incrementally advanced language object selected from the group consisting of a word, a phrase, and a grammatically correct sentence.

11. The computer-implemented method of claim 1, further comprising:
    accessing, by an Internet of Things device used by the individual, a remote cloud database of commonly used words, phrases, sentences, rhymes, and songs to retrieve the new material therefrom; and
    communicating the new material from the remote cloud database to the Internet of Things device to present the new material to the individual to learn.

12. The computer-implemented method of claim 1, further comprising configuring a baby monitor to act as an input device for the speech recognition performed by the voice-to-language processor.

13. The computer-implemented method of claim 1, further comprising configuring the incremental learning system to discard incoherent words and inconsistent words as candidates for the new material.

14. A computer program product for language learning and speech enhancement, the computer program product comprising a non-transitory computer readable storage medium having program instructions embodied therewith, the program instructions executable by a computer to cause the computer to perform a method comprising:
    transforming acoustic utterances uttered by an individual into textual representations thereof, by a voice-to-language processor configured to perform speech recognition; and
    accelerating speech development in the individual, by an incremental learning system that includes the voice-to-language processor and that processes the acoustic utterances using natural language processing and analytics to determine and incrementally provide new material to the individual for learning,
    wherein the individual is a child, and the method further comprises:
    displaying, on a display device, the new material to a guardian of the child for approval to reproduce to the child; and
    selectively providing, on a hardware media providing device, the new material to the child responsive to receiving the approval from the guardian, and wherein responsive to the individual being a baby, the voice-to-language processor discretizes baby babbling to consonants, letters, and words.

15. The computer program product of claim 14, wherein said accelerating step comprises configuring the incremental learning system to enhance current language skills of the individual using a current speech state and a current vocabulary state of the individual by suggesting, as the new material, a new word related to a known word by the user, the new word related to the known word by a relationship selected from the group consisting of a homonym, a synonym, and an antonym.

16. The computer program product of claim 14, wherein the method further comprises configuring the incremental learning system to enhance current language skills of the individual using a current speech state and a current vocabulary state of the individual by providing to the individual an incrementally enhanced language that is related to a known word by the user and is in the form of an object selected from the group consisting of a word, a phrase, a sentence, a rhyme, and a song.

17. The computer program product of claim 14, wherein the method further comprises:
 performing an analysis of a stored learning history for the individual;
 performing an analysis, based on the stored learning history for the individual, of (i) a learning speed of the individual, (ii) responses by the individual to previous new word suggestions, and (iii) classes of words previously unseen by the individual; and
 adapting the new material to a learning ability of the individual, responsive to one or more results of the analysis and one or more machine learning techniques.

18. An incremental learning system for language learning and speech enhancement, comprising:
 an Internet of Things device having a voice capture device configured to receive acoustic utterances uttered by an individual; and
 a cloud based system, configured to
  interface with the Internet of Things device to obtain the acoustic utterances therefrom,
  perform speech recognition to transform the acoustic utterances into textual representations thereof using a voice-to-text processor, and
  accelerate speech development in the individual, by processing the acoustic utterances using natural language processing and analytics to determine and incrementally provide new material to the individual for learning,
 wherein the Internet of Things device further has a hardware media presentation device configured to incrementally provide the new material to the individual from the cloud based system,
 wherein the individual is a child, and the cloud based system is further configured to:
  display the new material to a guardian of the child for approval to reproduce to the child; and
  selectively provide the new material to the child responsive to receiving the approval from the guardian, and
 wherein responsive to the individual being a baby, the voice-to-language processor discretizes baby babbling to consonants, letters, and words.

* * * * *